United States Patent Office 3,631,007
Patented Dec. 28, 1971

3,631,007
REMOVAL OF VANADIUM RESIDUES FROM
ETHYLENE COPOLYMERS
Bart A. Diliddo, Seven Hills, Ohio, assignor to The
B. F. Goodrich Company, New York, N.Y.
No Drawing. Filed Oct. 31, 1968, Ser. No. 772,355
Int. Cl. C08f 1/88, 15/40
U.S. Cl. 260—80.78         9 Claims

ABSTRACT OF THE DISCLOSURE

In a process whereby ethylene is copolymerized with a polyene under pressure with a vanadium catalyst to form amorphous vulcanizable elastomers, the vanadium compound content of said polymer is reduced and the color of the polymer improved by contacting at a higher pressure a polymerization effluent containing the ethylene copolymer and vanadium catalyst with a low molecular weight alcohol or ketone and thereafter washing this mixture under pressure with hydrocarbon and/or water to remove the residual vanadium compound.

BACKGROUND OF THE INVENTION

Amorphous sulfur-vulcanizable polymers of ethylene are desirably prepared by polymerizing ethylene, propylene or butene-1 if desired, with a polyene in a suspension system containing essentially only the monomers being polymerized, with a reduced vanadium catalyst as is described in U.S. Pat. 3,370,052.

While the process described in this patent provides sulfur-vulcanizable amorphous polymers, under normal operating procedures the resulting product contains residual vanadium compounds. Such compounds are undesirable since they may adversely affect aging of the polymer, may interfere with vulcanization reactions and cause discoloration of the polymers. For example, when only 100 parts per million of vanadium compound are present in a copolymer of ethylene, propylene and methyl tetrahydroindene, the dried polymer has a dark color which prevents use in applications where white rubber is desired. The prior art teaches use of alcohol or ketones to deactivate reduced metal catalysts, after which the treated polymerization mass is blown into a wash vessel where it is washed with hydrocarbon and/or water. These procedures have not been successfully applied to produce colorless ethylene-polyene copolymers made with vanadium catalysts.

SUMMARY OF THE INVENTION

It has now been found that in the polymerization of ethylene, propylene or butene-1 and a polyene, such as ethylidene norbornene, polymerized in the presence of a reduced vanadium catalyst, that if after the polymerization reaction the polymerization mixture is contacted with a catalyst deactivator as an alcohol or ketone and then washed while maintaining ethylene in, and pressure on, the mixture greater than the pressure under which the polymerization was conducted, that the residual vanadium compounds remaining in the resulting copolymer are readily reduced to less than 100, normally less than 50 parts per million, and as low as 10 to 20 parts per million and the resulting copolymers are substantially colorless.

DETAILED DESCRIPTION

The monomers polymerized in accordance with this invention are ethylene, another α-olefin as propylene or butene-1 and a polyene including for example, 1,4-hexadiene, ethylidene norbornene, dicyclopentadiene, methyl tetrahydroindene and the like. Any of the known polyenes, of which there are many, which are copolymerized with ethylene to provide unsaturation in the resulting copolymer may be used. The polyenes normally are aliphatic and alicyclic polyenes containing 4 to 10 carbon atoms and at least two >C=C< groups. The copolymers normally have average molecular weights above 20,000 and preferably above 50,000.

Such copolymers normally contain 50 mol percent or more of ethylene and less than about 15% of polyene. Particularly, useful are elastomeric interpolymers containing about 50 to less than 80 mol percent ethylene, at least 5 mol percent of propylene or butene, and the polyene in amount to provide in the interpolymer, olefinic unsaturation represented by an iodine number of from about 2 to about 35. These polymers may contain from about 0.1 to 10% of 1,4-hexadiene, dicyclopentadiene, butadiene, the norbornenes as vinyl and ethylidene, 1,4,9-decatriene, methyl heptadiene, cyclooctadiene, cyclodecadiene, 1,4-pentadiene and the like. Propylene is normally fed to the reactor in amounts greater than ethylene. This is readily controlled to obtain the desired polymer composition by a number of ways well known in the art.

One component of the catalyst is a hydrocarbon soluble vanadium compound, including for example, vanadium tetrahalides, vanadium oxyhalides, vanadyl acetylacetonate and vanadyl haloacetylacetonates. Typical hydrocarbon solvent vanadium catalysts include vanadium tetrachloride, vanadium oxytrichloride, vanadium acetylacetonate, vanadyl acetylacetonate and the like.

The other catalyst component is an alkyl aluminum compound of the general formula $R_xAlX_y$ wherein R is an alkyl group containing 2 to 8 carbon atoms, X is halogen, $x$ is 1 to 3, $y$ is 0 to 2, and $x+y=3$. Typical compounds aluminum dichloride, ethyl aluminum sesquichloride; diisobutyl aluminum fluoride, ethyl aluminum difluoride and the like. One of the catalyst components must contain a halogen atom. The molar ratio of alkyl aluminum compound and hydrocarbon soluble vanadium compound will be between about 15 to 1 and 1 to 1 but the preferred molar ratio is between 10 to 1 and 2 to 1.

While the improved process is particularly useful with polymerizations conducted in suspension in the substantial absence of diluents other than monomers, it is equally applicable to systems containing diluents or solvents. In such systems a ratio of 10 to 1 of diluent to monomers is often employed. These diluents are normally hydrocarbons including propane, butane, hexane, heptane, benzene, toluene, halogen-containing aliphatic compounds as perchloroethylene and the like. This invention is particularly useful in systems using less than a 2:1 ratio of diluent to monomer, based on the volume of propylene used.

Modifiers may also be used as is well known to those skilled in the art including small amounts of hydrogen, diethyl zinc and the like.

A polymerization temperature in the range of about −80° C. to about 25° C. may be employed, but more normally a temperature range of −20° C. to about 10° C. is employed and except at very low temperatures, the polymerizations are normally conducted under pressure.

The pressure at which the polymerization reactions are conducted normally range from about 25 to about 100 p.s.i.g., that is, about 2 to 7 atmospheres. At temperatures in the range of about −20 to about 10° C. pressures normally will be about 50 to 90 p.s.i.g.

At the conclusion of polymerization reaction, it is desired to destroy or deactivate the catalyst and this is efficiently done by contacting the polymerization mixture containing unreacted monomers and the active vanadium catalyst with known deactivators as an aliphatic alcohol or ketone. Useful materials include methanol, ethanol, propanol, hydroxylamine, acetylacetone, alkylene oxides and the like which normally contain from 1 to 6 carbon atoms. Lower molecular weight materials are normally preferred as methanol and acetylacetone so that a minimum amount is required to be added to stop the polymerization and which can be readily recovered.

The polymerization mixture to which the alcohol or ketone is to be added should be removed from the reactor before adding the alcohol or ketone so as not to contaminate the reaction zone which may be a vessel or a line with the shortstop. The alcohol or ketone is normally added in the effluent line from the reactor, which line may be of sufficient length, shape, and size to provide hold-up time for reaction of the alcohol or ketone with the vanadium catalyst.

In the prior art procedures, the polymerizer effluent is deactivated and washed at a pressure the same or less than that at which the polymerization reaction was run. It was found that when this procedure was followed, regardless of the washing technique used to remove the residual vanadium compounds as hydrocarbons or water which may contain alkali, reducing agents, and/or chelating agents, that there remained in the washed and dried copolymer enough vanadium compound to contribute to a discolored and otherwise undesirable product.

However, when proceeding in accordance with this invention, where a pressure higher than the pressure in the polymerization zone was maintained to retain ethylene in the polymerizer effluent while deactivating the catalyst with alcohol or other agents and washing the mixture of polymer and alcohol with hydrocarbons and/or water, the vanadium content of the resulting dried copolymers was normally less than about 50, as 40, parts per million and the copolymer was substantially color free. To obtain the full advantages of this invention it is necessary that there be at least a 15 pounds per square inch differential, preferably greater than 25 pounds per square inch of the pressure at the steps of deactivation and washing over the polymerization step. For example, when the polymerization reaction is conducted at a pressure of about 70 to 80 p.s.i., the pressure in the deactivation and washing zones would be about 100 p.s.i. or more. Further, for example, if the polymerization reaction is conducted at 80 p.s.i. and the pressure in the transfer line from the reactor is allowed to drop only to 75 p.s.i., polymers obtained, even after careful washing, contain more vanadium compound than is desired. The highest pressure normally used would be about 150 p.s.i.g., that is, the pressure of the reactor effluent at ambient (room) temperature. The deactivation and washing steps are normally conducted at a higher temperature than the polymerization temperature in the range of about 0 to 25° C.

The amount of alcohol as methanol or ketone, as acetylacetone normally used will vary between about 2 to 25 weight parts based on 100 of polymer, preferably about 5 to 15.

The washing step may be conducted with a hydrocarbon, preferably propylene or butylene and/or a water wash with water containing caustic at a concentration of about 1 to 5%, which water may also contain a chelating agent such as ethylenediaminetetraacetate, salicylic acid, tartaric acid, oxalic acid, dextrose; or about 0.5 to 10 percent water solutions of sodium salicylate, sodium tartarate, sodium oxalate and like complexing agents, preferably at a pH above 7. The amount of agent may be varied as desired. A useful range is 0.002 to 0.2 pound per pound of polymer.

EXAMPLE I

To a pressure vessel equipped with an agitator and cooling means, 49 pounds of propylene and 7.6 pounds of methyl tetrahydroindene were charged at a temperature of −5° C. and a pressure of 65 p.s.i.g. 5.6 pounds of ethylene was proportioned during the course of the polymerization to maintain a vapor ratio of 82.7 mols of propylene to 17.3 mols of ethylene. 0.0047 pound of vanadyl acetylacetonate and 0.0074 pound of diethyl aluminum chloride separately dissolved in toluene was added to the mixture. When the mixture had reached a total solids content (polymer) of about 25%, the polymerization slurry was blown into a short-stop vessel at a temperature of −15° C. and a pressure of 45 p.s.i.g. containing 0.865 pound of a mixture of 85.67% ethanol, 4.3% methanol, 9% isopropanol and 1% methyl isobutyl ketone. The slurry was agitated for 15 minutes. This mixture was then pumped to a wash tank and at a temperature of +5° C. and a pressure of 80 p.s.i.g. was washed for one hour with a 1.65% solution of 3 pounds of sodium hydroxide and 2.18 pounds tartaric acid. The polymer was separated from excess monomers and water and was dried and analyzed found to have a composition of 50 weight percent ethylene, 45 weight percent propylene and 5 weight percent methyl tetrahydroindene. The dry polymer contained 415 parts per million of residual vanadium and had an objectionable maroon color.

When this run was repeated with the exception that no flashing or vaporization was permitted in transferring the reaction mixture to the short-stop tank and the pressure was raised to 80 p.s.i.g., dried polymer from this slurry had a vanadium content of only 28 parts per million and was colorless.

EXAMPLE II

In another run following the exact procedure set forth in Example I, ethylene was flashed from the reactor until the vapor phase contained less than 5% ethylene, and the reaction vessel was then repressured with ethylene to 20 p.s.i.g. above the polymerization pressure, 85 p.s.i.g., pumped without permitting any flashing or vaporization to the short-stop vessel containing 0.78 pound of the alcohols and the same washing procedure followed. In this case the dry polymer was substantially colorless and contained only 20 parts per million of vanadium compounds.

EXAMPLE III

To further demonstrate the practice of the invention a continuous polymerization was conducted. 29.8 pounds of propylene, 3.94 pounds of ethylene and 10.3 pounds of methyl tetrahydroindene were charged to the reactor each hour along with catalyst components vanadium tris-acetylacetonate and diethyl aluminum chloride in toluene at a rate of 0.0133 pound of vanadium tris-acetylacetonate, 0.021 pound of diethyl aluminum chloride per hour, separately dissolved in toluene. The reaction was conducted at −10° C. at a pressure of 60 p.s.i.g. The residence time in the reactor was about 90 minutes. About 0.001 pound of hydrogen per hour was fed into the system to control molecular weight of the polymer. In the effluent line from the reactor, maintained at a pressure of 94 p.s.i.g., 1.33 pounds of methyl alcohol and 0.0133 pound acetylacetonate per hour were added to short-stop the reaction. The effluent then was pumped into a wash tank maintained at +5° C. and a pressure of 94 p.s.i.g. where the polymerization effluent and alcohol were washed with a 1.91% aqueous solution of sodium salicylate adjusted to pH=11 with NaOH at a rate of 75 pounds of washing solution per hour. After washing, the polymer, which was produced at a rate of 6 to 7 pounds per hour, was dried and analyzed and found to contain 61.3 mol percent ethylene, 35 mol percent propylene and 3.7 mol percent methyl tetrahydroindene. The polymer contained only 16 parts per million of vanadium compound which represents a 95% removal from the polymer. The polymer had a dilute solution viscosity of 1.43 determined from 0.2% in toluene solution at 25° C.

EXAMPLE IV

Another polymer was prepared in the continuous system of Example III. The monomers charged per hour were 29 pounds of propylene, 5 pounds of ethylene and 8.3 pounds of methyl tetrahydroindene. The reactor pressure was 68 p.s.i.g. The vanadium catalyst charged was the same but the amount of the aluminum compound was increased to 0.029 pound per hour. The reaction was stopped at 80 p.s.i.g. with 1.49 pounds of methyl alcohol per hour and washed with a 1.91% solution of sodium salicylate for one hour at a pressure of 100 p.s.i.g. After decanting the water solution, the polymer was recovered and dried. 5.7 pounds an hour of polymer were formed. The vanadium content of the dry polymer was only 15 parts per million. The polymer contained 59.8% ethylene, 36% propylene and 4.3% methyl tetrahydroindene. The dilute solution viscosity at 25° C. in toluene was 1.75. Samples of the polymer were compounded, based on weight parts hundred weight parts of polymer, with 75 FEF carbon black, 25 naphtha processing oil, 5 zinc oxide, 1 stearic acid, 3 sulfur, 1.5 mercaptobenzothiazole, 0.8 tetramethylthiuram disulfide, 0.8 dipentamethylenethiuram tetrasulfide and 1.5 octadecyl-3-(3,5-di-t-butyl-4-hydroxyphenyl)propionate. Samples were cured for 30 minutes at 320° F. The vulcanizates had a tensile strength of 2325 p.s.i., 300% modulus of 2100 p.s.i., elongation of 340%, Durometer A hardness of 70, Graves tear of 195, compression set after 22 hours at 70° C. of 24. This polymer is useful in forming belts, hose, gaskets and in tire construction. A particular utility, because of the absence of color in the polymer, is in white sidewall stocks for tires and light colored rubber articles.

EXAMPLE V

Another vulcanizable polymer was prepared with ethylidene norbornene by the continuous procedure described in Example III. Monomers charged per hour were 29.5 pounds of propylene, 4.25 pounds of ethylene and 0.539 pound of ethylidene norbornene. 0.0139 pound of vanadium tris-acetylacetonate and 0.0703 pound diisobutyl aluminum chloride per hour, both dissolved separately in toluene. 0.016 pound per hour of diethyl zinc was used as a modifier. A sample was taken after the polymerization had been run for 155 hours, short-stopped with a mixture of 1.52 pounds of methanol and 0.0152 pound of acetylacetone. The residence time in the reactor was 90 minutes at —10° C. at a pressure of 52 p.s.i.g. After mixing the alcohol with the polymerization effluent at 79 p.s.i.g. the mixture was pumped to a wash vessel at a pressure of 79 p.s.i.g. and washed at a temperature at 5° C. for one hour with 2% water solution containing 0.936 pound of sodium salicylate. The resulting polymer, after separation from the water and unreacted monomers, was dried and found to be substantially color free. This polymer had a dilute solution viscosity of 1.57 and a large rotor Mooney value after 10 minutes at 212° F. of 50. The polymer contained 44% propylene and 5.3% of ethylidene norbornene. Samples of the polymer were compounded to the same recipe set forth in Example IV and cured for 25 minutes at 320° F. The tensile strength was 2275 p.s.i., elongation 230%, Durometer A hardness 73, Graves tear 104, compression set after 22 hours at 70° C. of 15. After air aging for 14 days at 115° C. the tensile strength was 2075 p.s.i., showing 91% retention. The Durometer A hardness was 82 and the aged sample passed the 180° bend test.

This polymer is useful in white sidewall tire stocks. A compound of, in weight parts, 25 copolymer, 75 natural rubber, 30 titanium oxide, 20 zinc oxide, 20 clay, 3 sulfur, 1 n-cyclohexyl-2-benzylthiazole sulfenamide, 0.2 di-o-tolyl guanidine and 1 2,2'-methylene-bis-4-ethyl-6-t-butylphenol is a useful sidewall compound. When cured, the vulcanizates have good ozone resistance and good abrasion and soiling resistance.

I claim:

1. In a process wherein ethylene is copolymerized with an α-olefin selected from the group consisting of propylene and butene-1 and a polyene with a hydrocarbon soluble vanadium catalyst under pressure of from about 25 to about 100 p.s.i.g. at a temperature of about —80° C. to about 25° C. and after polymerization the reaction mixture is deactivated, the improvement which comprises deactivating the polymerization mixture at a pressure of at least 15 p.s.i. greater than the polymerization pressure.

2. The process of claim 1 wherein ethylene, propylene and a polyene are copolymerized and the deactivator is an alcohol or a ketone.

3. The process of claim 2 wherein the copolymer contains more than 50 mol percent ethylene, propylene and less than 10% polyene, the catalyst is a hydrocarbon soluble vanadium compound reduced with an alkyl aluminum compound, the polymerization temperature is in the range of about —20 to about 10° C., the polymerization pressure is about 2 to 7 atmospheres, the alcohol or ketone contains from 1 to 6 carbon atoms, the pressure of the deactivation step is greater than 15 pounds higher than the pressure of the copolymerization step, and the treated polymerization effluent is washed with water.

4. The process of claim 2 wherein the copolymer contains more than 50 mol percent ethylene, propylene and less than 10% polyene, the catalyst is a hydrocarbon soluble vanadium compound reduced with an alkyl aluminum compound, the polymerization temperature is in the range of about —20 to about 10° C., the polymerization pressure is about 2 to 7 atmospheres, the alcohol or ketone contains from 1 to 6 carbon atoms, the pressure of the deactivation step is greater than 15 pounds higher than the pressure of the copolymerization step, and the treated polymerization effluent is washed with a hydrocarbon.

5. The process of claim 3 wherein the water contains 1 to 5% caustic.

6. The process of claim 3 wherein the water contains a chelating agent at a pH above 7.

7. The process of claim 4 wherein the hydrocarbon is propylene.

8. The process of claim 6 wherein there is used a mixture of alcohols and ketones and the chelating agent is selected from the group consisting of sodium salicylate, sodium tartarate and sodium oxalate in amount of about 0.002 to 0.2 pound per pound of polymer.

9. The process of claim 4 wherein the washed effluent is then washed with water containing a chelating agent in amount of about 0.002 to 0.2 pound per pound of polymer.

References Cited

UNITED STATES PATENTS 3,299,033   1/1967   Douglas _____ 260—94.9

JAMES A. SEIDLECK, Primary Examiner

260—94.9 F